United States Patent
Moga et al.

(10) Patent No.: US 11,015,485 B2
(45) Date of Patent: May 25, 2021

(54) SEAL RING FOR TURBINE SHROUD IN GAS TURBINE ENGINE WITH ARCH-STYLE SUPPORT

(71) Applicant: Rolls-Royce Corporation, Indianapolis, IN (US)

(72) Inventors: Corina Moga, Carmel, IN (US); Shaling Starr, Fishers, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 346 days.

(21) Appl. No.: 16/386,809

(22) Filed: Apr. 17, 2019

(65) Prior Publication Data

US 2020/0332670 A1   Oct. 22, 2020

(51) Int. Cl.
 *F01D 11/08* (2006.01)
 *F01D 25/24* (2006.01)
 *F01D 9/04* (2006.01)

(52) U.S. Cl.
 CPC ............ *F01D 25/246* (2013.01); *F01D 9/04* (2013.01); *F01D 11/08* (2013.01); *F05C 2253/04* (2013.01); *F05D 2230/60* (2013.01); *F05D 2240/11* (2013.01); *F05D 2300/6033* (2013.01)

(58) Field of Classification Search
 CPC ........... F01D 9/04; F01D 11/08; F01D 25/246
 See application file for complete search history.

(56) References Cited

U.S. PATENT DOCUMENTS

| 4,662,824 | A | * | 5/1987 | Ortolano | F01D 5/24 416/196 R |
| 4,988,266 | A | * | 1/1991 | Nakamura | C22C 19/055 415/173.1 |
| 5,104,287 | A | | 4/1992 | Ciokajlo | |
| 6,733,235 | B2 | | 5/2004 | Alford et al. | |
| 6,808,363 | B2 | | 10/2004 | Darkins, Jr. et al. | |
| 7,686,577 | B2 | | 3/2010 | Morrison et al. | |
| 7,771,160 | B2 | | 8/2010 | Shi et al. | |
| 8,167,546 | B2 | | 5/2012 | Shi et al. | |
| 8,206,085 | B2 | * | 6/2012 | Ammann | F01D 9/04 415/136 |

(Continued)

FOREIGN PATENT DOCUMENTS

| DE | 102008044450 A1 | 2/2009 |
| EP | 2589774 A1 | 5/2013 |

(Continued)

OTHER PUBLICATIONS

Corman, Gregory S. and Luthra, Krishan L.; Melt Infiltrated Ceramic Composites (HIPERCOMP) for Gas Turbine Engine Applications; DOE/CE/41000-3; May 1994-Sep. 2005; pp. 1-507.

(Continued)

*Primary Examiner* — Woody A Lee, Jr.
(74) *Attorney, Agent, or Firm* — Barnes & Thornburg LLP

(57) ABSTRACT

A blade track assembly for a gas turbine engine includes a plurality of blade track segments. The blade track segments are arranged circumferentially around a central axis to form a blade track. Each of the plurality of blade track segments includes a first circumferential end face, a second circumferential end face opposite the first circumferential end face, a radially-outer surface, and a radially inner surface opposite the radially-outer surface.

18 Claims, 4 Drawing Sheets

(56) References Cited

U.S. PATENT DOCUMENTS

| | | |
|---|---|---|
| 8,246,299 B2 | 8/2012 | Razzell et al. |
| 8,496,431 B2 | 7/2013 | Habarou et al. |
| 8,511,975 B2 | 8/2013 | Shi et al. |
| 8,684,689 B2 | 4/2014 | Guo et al. |
| 8,801,372 B2 | 8/2014 | Shi et al. |
| 8,834,106 B2 | 9/2014 | Luczak |
| 8,905,709 B2 | 12/2014 | Dziech et al. |
| 9,399,926 B2 * | 7/2016 | Wiebe ................. F01D 5/06 |
| 9,441,501 B2 * | 9/2016 | Ballard, Jr. ............ F01D 25/26 |
| 9,458,726 B2 | 10/2016 | Lamusga et al. |
| 9,587,504 B2 * | 3/2017 | McCaffrey ............ F01D 11/08 |
| 9,702,262 B2 * | 7/2017 | Brandl ................ F01D 11/122 |
| 9,759,082 B2 | 9/2017 | Thomas et al. |
| 10,132,180 B2 * | 11/2018 | Leszczynski ......... F01D 25/005 |
| 10,166,708 B2 * | 1/2019 | Magnaudeix ......... F04D 29/526 |
| 10,697,315 B2 * | 6/2020 | Freeman ............ F01D 25/005 |
| 2004/0047726 A1 | 3/2004 | Morrison |
| 2010/0150703 A1 | 6/2010 | Gonzalez et al. |
| 2012/0156029 A1 | 6/2012 | Karafillis et al. |
| 2012/0301269 A1 | 11/2012 | Alvanos et al. |
| 2013/0011248 A1 | 1/2013 | Croteau et al. |
| 2014/0202168 A1 | 7/2014 | Shapiro et al. |
| 2016/0208633 A1 | 7/2016 | Hafner et al. |
| 2016/0258304 A1 * | 9/2016 | Sippel ................. F01D 25/246 |
| 2016/0319689 A1 * | 11/2016 | Vetters ................. C04B 35/83 |
| 2016/0333718 A1 | 11/2016 | Vetters et al. |
| 2017/0204744 A1 * | 7/2017 | Varney ................. F01D 25/246 |
| 2017/0350268 A1 * | 12/2017 | McCaffrey ............ F01D 11/08 |
| 2018/0080343 A1 | 3/2018 | Groleau et al. |
| 2018/0156068 A1 | 6/2018 | Roussille et al. |

FOREIGN PATENT DOCUMENTS

| | | |
|---|---|---|
| FR | 2980235 B1 | 4/2015 |
| GB | 2235730 A | 3/1991 |
| GB | 2468768 A | 9/2010 |
| WO | 2010058137 A1 | 5/2010 |

OTHER PUBLICATIONS

Extended European Search Report, European Application No. 16164265.7-1610, Sep. 30, 2016, 7 pages.

Extended European Search Report, European Application No. 16165824.0-1610, Sep. 30, 2016, 7 pages.

* cited by examiner

SEAL RING FOR TURBINE SHROUD IN GAS TURBINE ENGINE WITH ARCH-STYLE SUPPORT

FIELD OF THE DISCLOSURE

The present disclosure relates generally to gas turbine engines, and more specifically to ceramic-containing composite blade tracks used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies that perform work on or extract work from gases moving through a primary gas path of the engine. The rotating wheel assemblies include disks carrying blades around their outer edges. When the rotating wheel assemblies turn, tips of the blades move along blade tracks that are arranged around the rotating wheel assemblies. Such blade tracks are adapted to reduce the leakage of gas over the blades without interaction with the blades. The blade tracks may also be designed to minimize leakage of gas into or out of the primary gas path.

SUMMARY

The present disclosure may comprise one or more of the following features and combinations thereof.

According to the present disclosure, A blade track assembly for a gas turbine engine includes a plurality of blade track segments and an annular ring. The plurality of blade track segments include only isotropic ceramic materials. The annular band includes anisotropic ceramic-matrix composite materials. Each of the plurality of blade track segments are wedge shaped and the plurality of blade track segments are positioned circumferentially around an axis to form a ring. The annular band is disposed circumferentially around each of the plurality of blade track segments to provide a radially inward force that acts against each of the plurality of blade track segments such that each of the plurality of blade track segments act as a voussoir to maintain a form of the ring.

In some embodiments, each of the plurality of blade track segments include a first end face, a second end face spaced apart circumferentially from the first end face, and a radially-outer surface that extends between the first end face and the second end face. Each end face of the blade track segments are arranged entirely along a plane that extends radially through the axis.

In some embodiments, the radially outer surface of each of the blade track segments is continuous and formed without holes or protrusions. Each of the blade track segments includes a radially inner surface that is continuous and formed without holes or protrusions. The radially-outer surface is spaced apart from the axis a first radial distance and the radially-inner surface is spaced apart from the axis a second radial distance that is less than the first radial distance and each blade track segment has a constant thickness defined by the difference between the first distance and the second distance.

In some embodiments, the first end face and the second end face interconnect directly the radial-outer and radially-inner surfaces without any protrusions or cutouts formed therein. The plurality of blade track segments include a plurality of first blade track segments and a plurality of second blade track segments with an axially-facing surface that is offset axially from the plurality of first blade track segments.

In some embodiments, the blade track assembly further includes a carrier arranged circumferentially around the annular band to support the plurality of blade tracks relative to the axis, and the carrier engages a circumferential end face of the second blade track segment to block rotation of the plurality of blade track segments about the axis. The carrier is multi-piece in the circumferential direction and engages the leading end and the trailing end each of the first blade track segments to limit axial movement of the plurality of blade track segments relative to the axis.

In some embodiments, a first blade track segment included in the plurality blade track segments has a first axial length and a second blade track segment included in the plurality of blade track segments has a second axial length that is greater than the first axial length. The first blade track segment has a first circumferential length, the second blade track segment has a second circumferential length, and the first circumferential length is greater than the second circumferential length.

In some embodiments, the blade track assembly further includes a ceramic cloth ring that extends circumferentially around the plurality of blade track segments and located radially between the plurality of blade track segments and the annular band. The ceramic cloth ring has a first axial length and the annular band has a second axial length that is less than the first axial length.

According to another aspect of the present disclosure, a method includes: positioning a plurality of blade track segments circumferentially around a central axis, each blade track segment shaped to extend part-way around the central axis, locating the plurality of blade track segments around the central axis to form a ring of the plurality of blade track segments, heating an annular ceramic-matrix composite band, positioning the annular ceramic-matrix composite band circumferentially around the plurality of blade track segments after heating the annular ceramic-matrix composite band, and applying a compressive force against the each of the plurality of blade track segments with the annular ceramic-matrix composite band to maintain a form of the ring.

In some embodiments, the step of positioning a plurality of blade track segments includes positioning a plurality of first blade track segments partway around the central reference axis, each of the plurality of first blade track segments having a first axial width, and positioning at least one second blade track segment partway around the central axis between two of the first blade track segments to form the ring, the at least one second blade track segment having a second axial width that is greater than the first axial width.

In some embodiments, the method further includes arranging a carrier circumferentially around the plurality of blade track segments to cause the carrier to engage the second blade track segment to limit rotation of the plurality of blade track segments relative to the axis.

In some embodiments, the method further includes positioning a ceramic cloth ring circumferentially around the plurality of blade track segments before positioning the annular ceramic-matrix composite band around the plurality of blade track segments.

In some embodiments, the method further includes providing a carrier and engaging the ceramic cloth ring with the carrier to form a seal between the carrier and the plurality of blade track segments to block fluid flow between the carrier and the blade track segments in an axial direction.

These and other features of the present disclosure will become more apparent from the following description of the illustrative embodiments.

DETAILED DESCRIPTION OF THE DRAWINGS

Figure 1:
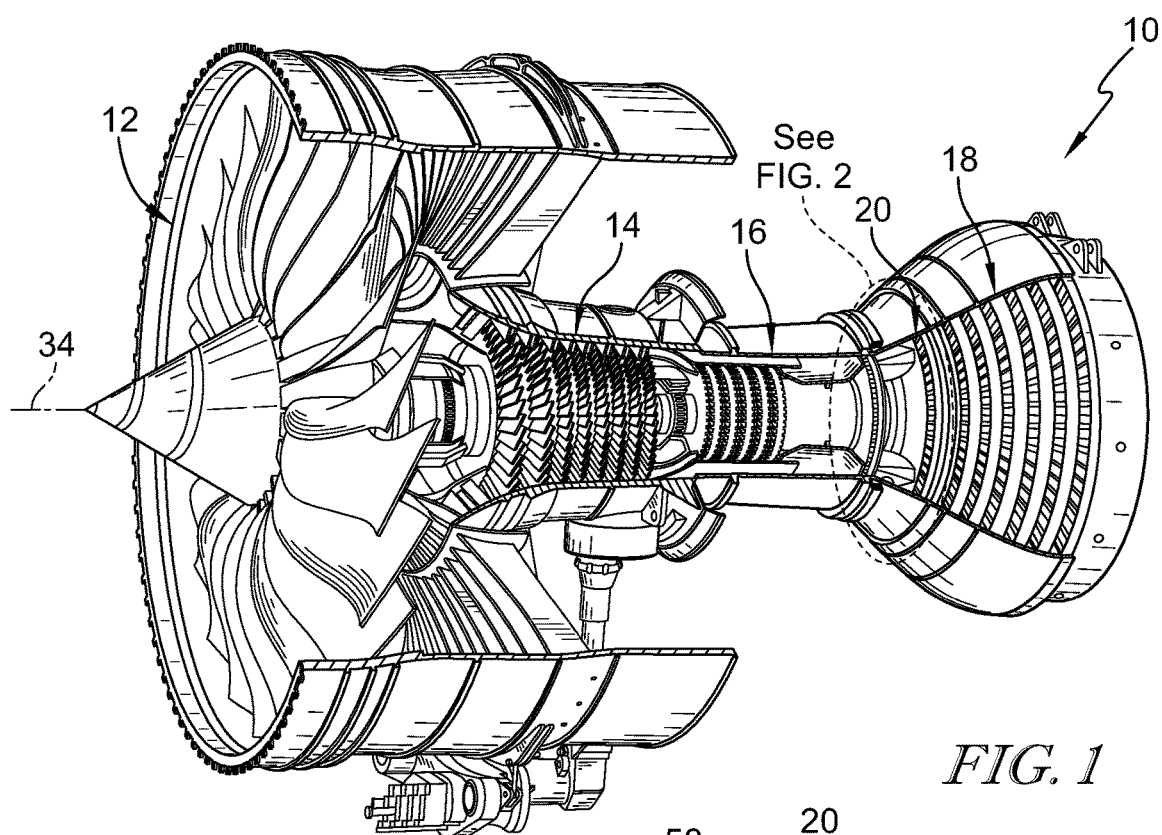
FIG. 1 is a perspective view of a gas turbine engine cut away to show that the engine includes a fan, a compressor, a combustor, and a turbine.

For the purposes of promoting an understanding of the principles of the disclosure, reference will now be made to a number of illustrative embodiments illustrated in the drawings and specific language will be used to describe the same.

An aerospace gas turbine engine 10 is cut-away to show that the engine 10 includes a fan 12, a compressor 14, a combustor 16, and a turbine 18 in FIG. 1. The fan 12 pushes air through the engine 10 to propel an aircraft. The compressor 14 compresses and delivers air to the combustor 16. The combustor 16 mixes fuel with the compressed air received from the compressor 14 and ignites the fuel. The hot, high pressure products of the combustion reaction in the combustor 16 are directed into the turbine 18 and the turbine 18 extracts work to drive the compressor 14 and the fan 12.

Figure 2:
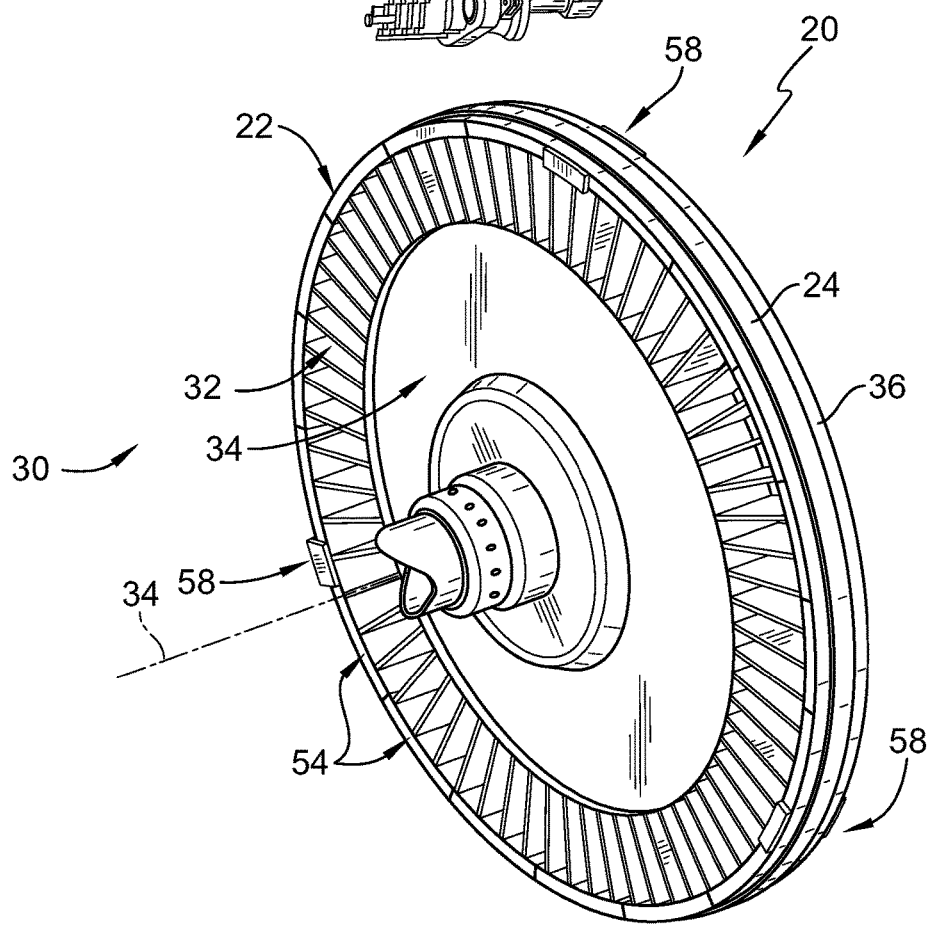
FIG. 2 is a perspective view of a blade track assembly adapted for use in the turbine of the gas turbine engine of FIG. 1 to block hot gases from passing over blades of a turbine wheel showing that the blade track assembly includes a plurality of blade track segments each having a wedge shape and arranged circumferentially adjacent to one another to act as voussoirs and an annular band extending around the segments to hold the blade track segments in a form of a ring circumferentially around an axis.

The turbine 18 illustratively includes at least one turbine wheel assembly 30 and a blade track assembly 20 positioned to surround the turbine wheel assembly 30 as shown in FIG. 2. The turbine wheel assembly 30 includes a plurality of blades 32 coupled to a rotor disk 35 for rotation therewith. The hot, high pressure combustion products from the combustor 16 are directed toward the blades 32 of the turbine wheel assemblies 30. The blades 32 are in turn pushed by the combustion products to cause the turbine wheel assembly 30 to rotate relative to the blade track assembly 20 around an axis 34; thereby, driving the rotating components of the compressor 14 and/or the fan 12.

The blade track assembly 20 extends around the turbine wheel assembly 30 to block combustion products from passing over the blades 32 as suggested in FIG. 2. The blade track assembly 20 includes a plurality of blade track segments 22 that cooperate to form a ring and annular band 24 positioned radially-outward from and circumferentially around the blade track segments 22 as shown in FIG. 2. Each of the blade track segments 22 are formed in the shape of a wedge so that when combined the plurality of blade track segments 22 each act as a voussoir to hold the other blade track segments 22 in the shape of the ring. The annular band 24 provides a radially inward force on each of the blade track segments 22 that retains the plurality of blade track segments 22 together to maintain the blade track segments 22 in the form of a ring.

In the illustrative embodiment, each of the plurality of blade track segments 22 is formed from only isotropic ceramic materials while the annular band 24 is formed from anisotropic ceramic materials. The isotropic ceramic material of each blade track segment 22 provides increased resistance to compressive forces caused by the radially inward force provided by the annular band 24 on each of the blade track segments 22. The anisotropic ceramic material of the annular band 24 has increased tensile strength in the circumferential hoop direction to reinforce the annular band 24 as it provides the radially inward force on the plurality of blade track segments 22. The plurality of blade track segments 22 and the annular band 24 have similar coefficients of thermal expansion due to the similarities in the materials used in each. This allows the plurality of blade track segments 22 and the annular band 24 may expand in unison when subjected to higher temperatures and to contract in unison when subjected to lower temperatures.

Some suitable isotropic ceramic materials include alumina ($Al_2O_3$), zirconia (ZrO2), silicon carbide (SiC), boron carbide (B4C) or silicon nitride (Si3N4), however, in other embodiments, any suitable isotropic ceramic material may be used. Some suitable anisotropic materials include a ceramic matrix composite with silicon carbide fibers disposed in a silicon carbide matrix; however, any suitable ceramic matrix composite material may be used.

Figure 3:
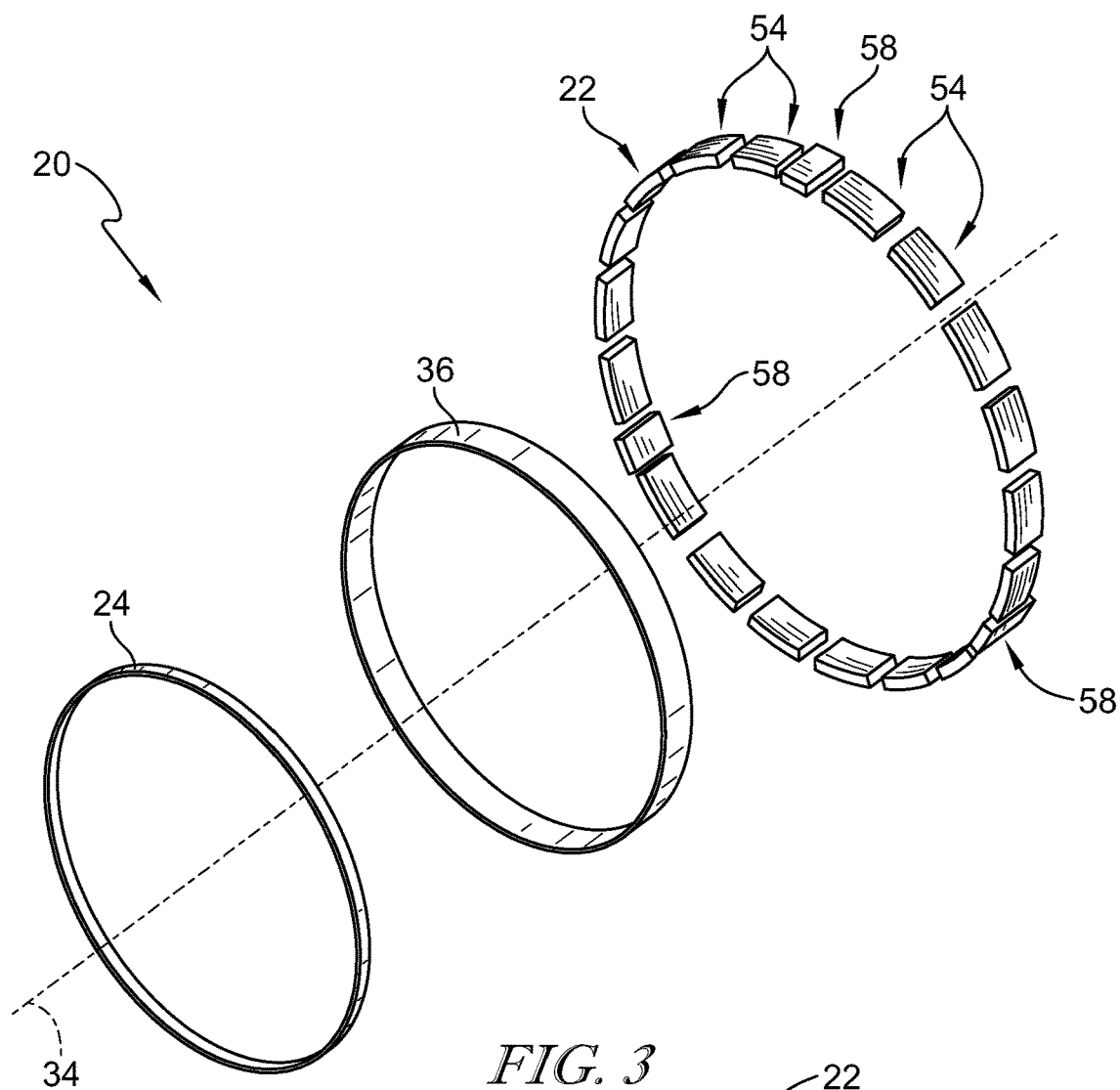
FIG. 3 is an exploded assembly view of the blade track assembly of FIG. 2 including the annular band, a ceramic fabric in the form of a ring, and the plurality of blade track segments.

The blade track assembly 20 further includes a ceramic cloth ring 36 formed from ceramic materials and arranged around each of the plurality of blade track segments 22 as shown in FIG. 2 and suggested in FIG. 3. The ceramic cloth ring 36 provides a seal to block hot gases from passing around the plurality of blade track segments 22 during operation of the gas turbine engine 10. The annular band 24 extends circumferentially around the ceramic cloth ring 36 to retain the ceramic cloth ring 36 in position relative to the plurality of blade track segments 22 and to provide the seal.

Figure 4:
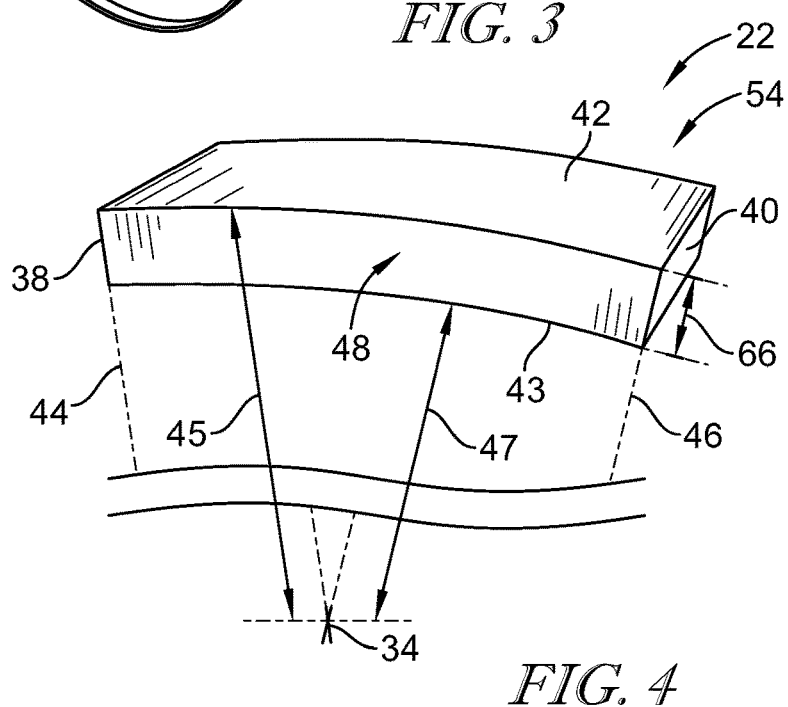
FIG. 4 is an enlarged perspective view of one of the plurality of blade track segments showing that each blade track segment includes a first circumferential end and a second circumferential end face spaced apart circumferentially from the first circumferential end face, and showing that each end face is arranged along respective planes that extend radially through the axis.

Each of the blade track segments 22 is monolithic and includes a first circumferential end face 38, a second circumferential end face 40, a radially-outer surface 42 that extends circumferentially between the first and second end faces 38, 40, and a radially-inner surface 43 opposite the radially-outer surface 42 as shown in FIG. 4. The first and second circumferential end faces 38, 40 are arranged entirely along respective planes 44, 46 that extend radially through the axis 34.

The radially-outer surface 42 and the radially-inner surface 43 are continuous and formed without holes or protrusions to minimize stresses in each of the plurality of blade track segments 22. The radially-outer surface 42 is spaced radially from the axis 34 a first constant distance 45 while the radially-inner surface 43 is spaced radially from the axis 34 a second constant distance 47. In this way, each blade track segment 22 has a constant thickness defined by the difference between the first distance 45 and the second distance 47. As such, each blade track segment 22 is a simple and solid wedge of the annular ring.

The annular band 24 is arranged along the radially-outer surface 42 and urges the circumferential end faces 38, 40 of each of the blade track segments 22 into engagement with one another to maintain the form of the ring. Tension in the annular band 24 causes each of the blade track segments 22 to apply a compressive force on one another between each circumferential end face 38, 40. When each blade track segment 22 is positioned adjacent to one another to form the ring, the circumferential end faces 38, 40 establish an interface that evenly distributes the compressive loads acting circumferentially between each end face of the blade track segments 22.

Orthotropic materials may be used to form the blade track segments 22 into the form of the ring. In such embodiments, stresses may be imparted onto each blade track segment 22 in undesirable locations, particularly in a circumferentially central region 48 of each blade track segment near the leading edge. In the illustrative embodiment, forming each blade track segment 22 from isotropic ceramic materials reduces these stresses when the blade track segments 22 are maintained in the form of a ring by the annular band 24.

Figure 5:
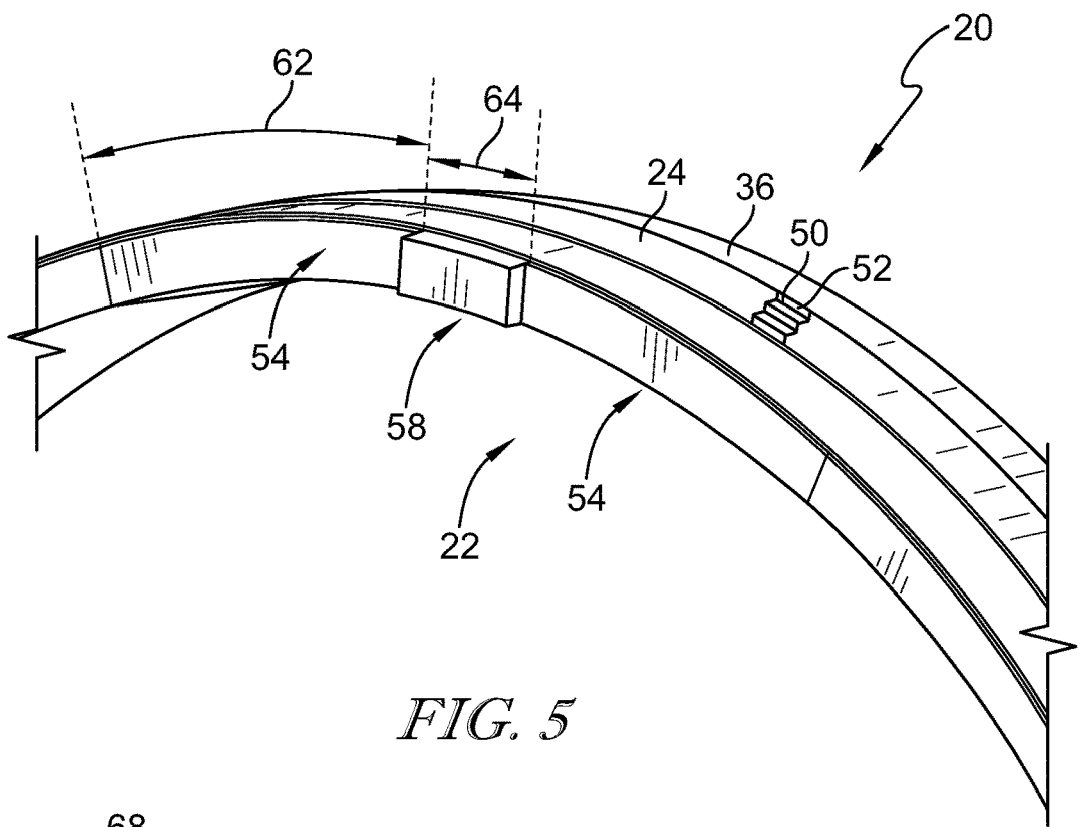
FIG. 5 is an enlarged perspective view of a portion of the blade track assembly showing that the plurality of blade track segments includes at least one blade track segment that protrudes axially outward from the rest of the blade track segments.

The annular band 24 includes at least one ceramic reinforcement fiber 50 suspended in ceramic matrix material 52 as shown in a cut-away portion of the annular band 24 in FIG. 5. The at least one ceramic reinforcement fiber 50 is oriented in the circumferential hoop direction to reinforce the annular band 24 for application of the radially inward force on the plurality of blade track segments 22. In some embodiments, the fiber 50 is included in a ply or a tow. The ceramic matrix material 52 surrounds the at least one ceramic reinforcement fiber 50. In this way, the annular band 24 is anisotropic with good tensile strength in the circumferential hoop direction so that the annular band 24 may apply the radially inward force on the plurality of blade track segments 22.

Figure 6:
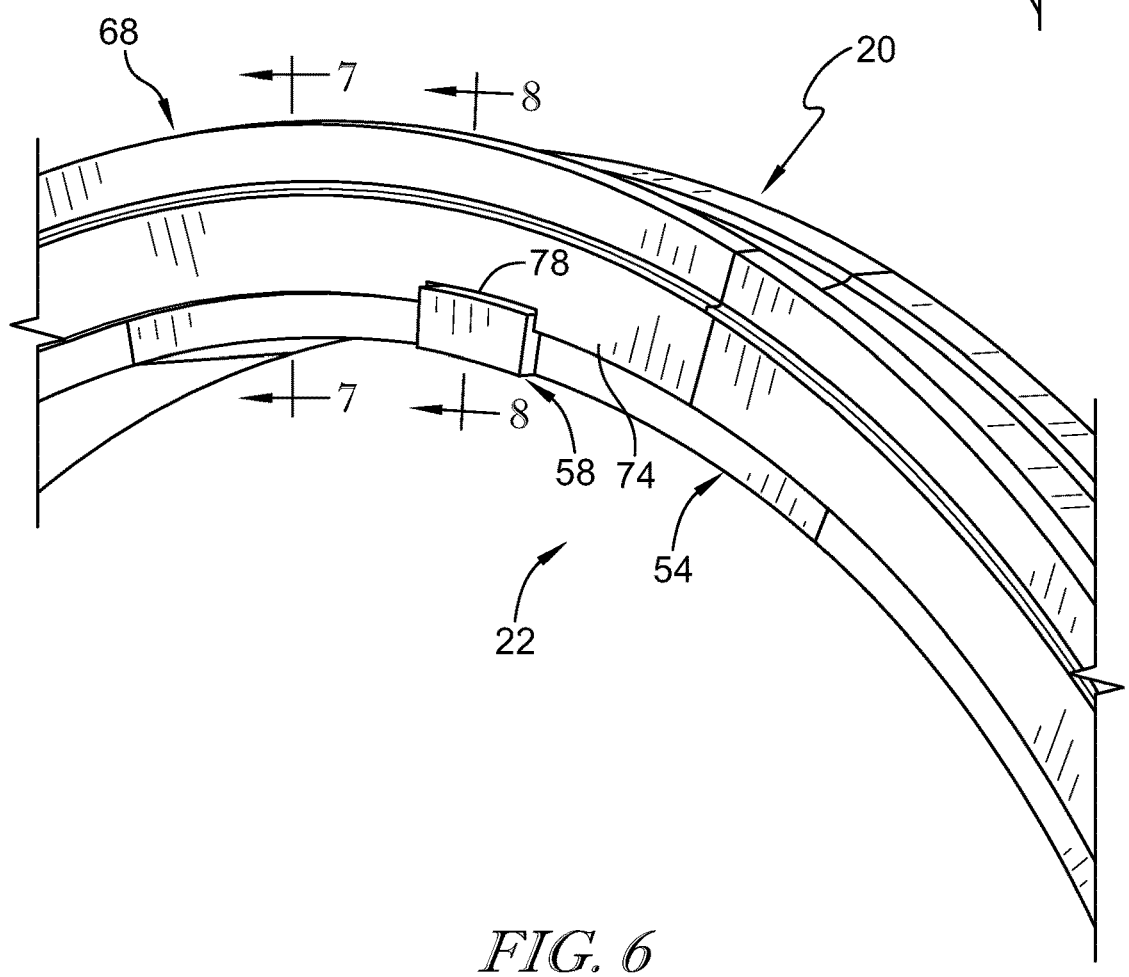
FIG. 6 is an enlarged perspective view of the portion of the blade track assembly from FIG. 5 further including a carrier arranged circumferentially around the plurality of blade track segments and configured to engage the at least one blade track segment protruding from the other blade track segments to provide an anti-rotation feature for the blade track assembly to block rotation of the plurality of blade tracks in the circumferential direction.

The plurality of blade track segments 22 includes a plurality of first blade track segments 54 and at least one second blade track segment 58 as shown in FIGS. 5 and 6. The first blade track segment 54 included in the plurality of blade track segments 22 has a first axial width 56 while the second blade track segment 58 included in the plurality of blade track segments 22 has a second axial width 60 that is greater than the first axial width 56. The first blade track segment 54 has a first circumferential length 62 and the second blade track segment 58 has a second circumferential length 64 that is less than the first circumferential length 62. The first and second blade track segments 54, 58 have a radial thickness 66 that is constant across all of the blade track segments 22 from the leading end to the trailing end.

Figure 7:
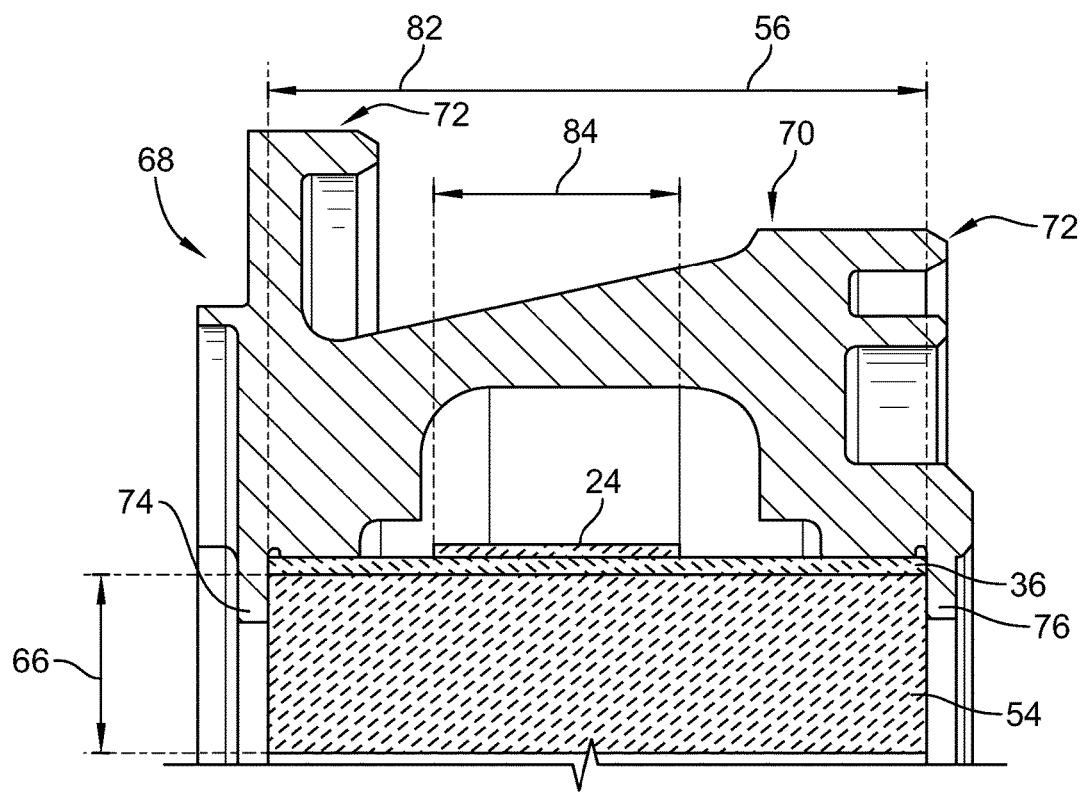
FIG. 7 is a cross sectional view taken along line 7-7 of FIG. 6 that extends through a first of the plurality of blade track segments having a first axial width and showing that the carrier includes radially-inward extending flanges on both axial sides of the first blade track segment to block axial movement of the blade track assembly.
Figure 8:
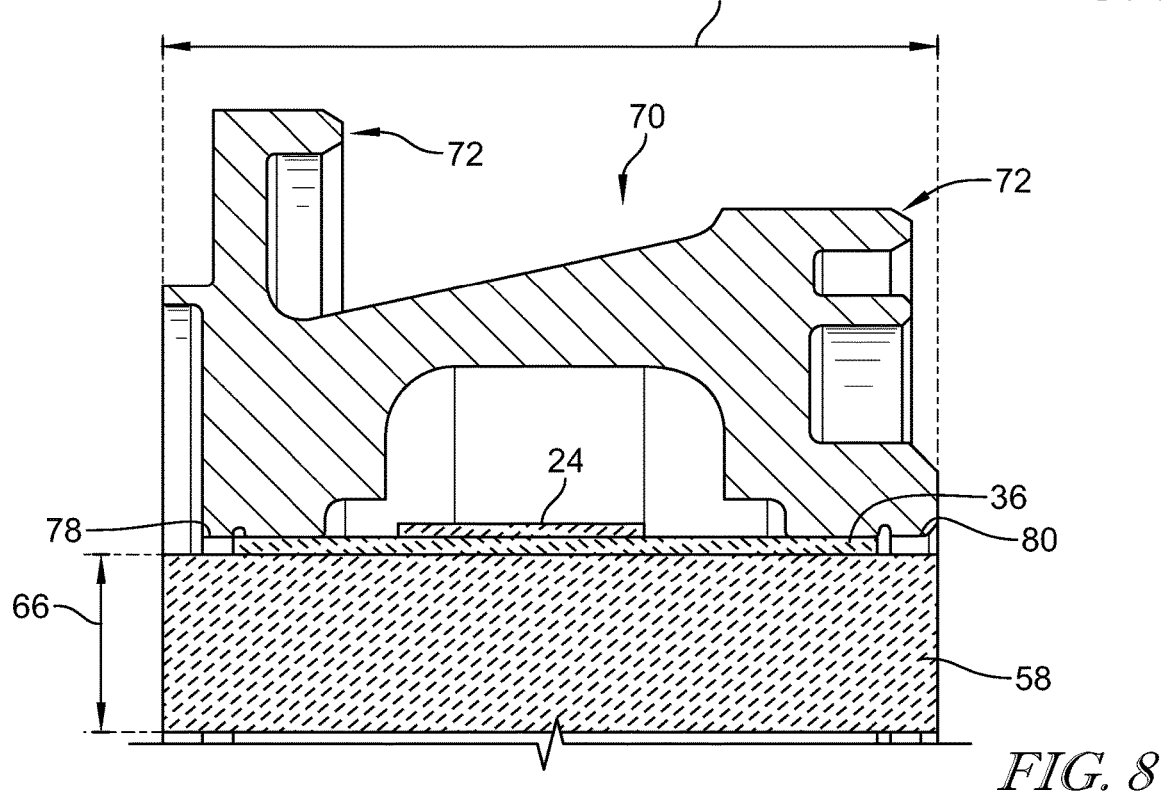
FIG. 8 is a cross sectional view taken along line 8-8 of FIG. 6 that extends through a second of the plurality of blade track segments having a second axial width that is greater than the first axial width so that the second blade track segment protrudes axially forward and aft of the flanges through apertures formed in the carrier to provide the anti-rotation feature to block circumferential rotation of the plurality of blade track segments relative to the carrier.

In the illustrative embodiment, the blade track assembly 20 further includes a carrier 68 that cooperates with the second blade track segment 58 to provide an anti-rotation feature for the plurality of blade track segments 22 as shown in FIGS. 5-8. The carrier 68 includes a carrier body 70, a plurality of hangers 72, a leading edge attachment flange 74, and a trailing edge attachment flange 76 as shown in FIGS. 6-8.

The carrier body 70 is arranged radially outward from the plurality of blade track segments 22. The plurality of hangers 72 are configured to couple the blade track assembly 20 to other components within the gas turbine engine, such as, for example, a turbine case, to locate and retain the blade track assembly 20 relative to the turbine 18. The leading edge attachment flange 74 extends radially inward from the carrier body 70 along the leading edge of the plurality of blade track segments 22. The trailing edge attachment flange 76 extends radially inward from the carrier body 70 along the trailing edge of the plurality of blade track segments 22.

Each of the first blade track segments 54 are located axially between the leading edge attachment flange 74 and the trailing edge attachment flange as shown in FIGS. 6 and 7. With the plurality of first blade track segments 54 located axially between each of the attachment flanges 74, 76, the plurality of blade track segments are blocked from moving axially relative to the carrier 68. The leading edge attachment flange 74 and the trailing edge attachment flange 76 are each formed to include an attachment aperture 78, 80. The attachment apertures 78, 80 are aligned axially with one another and have a circumferential length that is slightly larger than the circumferential length 64 of the second blade track segment 58. At least one second blade track segment 58 with the greater second axial width 60 protrudes axially forward from the first blade track segments 54 and is received within each of the attachment apertures 78, 80 as shown in FIGS. 6 and 8. With the second blade track segment 58 received in the attachment apertures 78, 80, the plurality of blade track segments are blocked from rotating in the circumferential direction about the axis 34.

Each attachment aperture 78, 80 is defined by a first circumferential wall 86, a second circumferential wall 88, and a radially-outer wall 90 as shown in FIG. 6. The first and second circumferential end walls 86, 88 are spaced apart circumferentially from one another and extend radially inward away from the radially-outer wall 90. The radially-outer wall 90 interconnects the first circumferential wall 86 and the second circumferential wall 88. The attachment apertures 78, 80 are unbounded radially inward from the radially-outer wall 90 to allow for the second blade track segment 58 to extend radially outward into the attachment apertures 78, 80 between the circumferential walls 86, 88.

The protruding portions of the second blade track segment 58 extend axially forward and aft of each corresponding attachment flange 74, 76 and each include a first circumferential face 92, a second circumferential end face 94, and a radially-outer surface 96 as shown in FIG. 6. The first circumferential end face 92 engages the first circumferential wall 86 while the second circumferential end face 94 engages the second circumferential wall 88 to block rotation of the plurality of blade track segments 22 around the axis 34 in both directions. The first and second circumferential walls 86, 88 extend only partway radially inward along the first and second end faces 92, 94 such that only a portion of the circumferential end faces 92, 94 engage the circumferential walls 86, 88. A slight gap may be established between the radially-outer surface 96 and the radially-outer wall 90 to accommodate thermal growth.

In the illustrative embodiment, the blade track assembly includes three of the second blade track segments 58 spaced circumferentially around the axis 34 from one another to provide the anti-rotation feature as shown in FIGS. 2 and 3. In other embodiments, any suitable number of second blade track segments 58 may be used to provide the anti-rotation feature. Illustratively, each second blade track segment 58 is spaced apart from one another about 120 degrees around the axis 34, however any suitable spacing may be used.

The annular band 24 and the ceramic cloth ring 36 are arranged along the radially-outer surface 42 of the blade track segments 22 axially between the leading and trailing edge flanges 74, 76 as shown in FIGS. 7 and 8. The annular band 24 applies the radially inward force on the ceramic cloth ring 36 to maintain the ceramic cloth ring 36 in engagement with the radially-outer surface 42 of the blade track segments 22. The ceramic cloth ring 36 engages a forward support ridge 98 and an aft support ridge 100 of the carrier 68 to block flow of gases axially between the plurality of blade track segments 22 and the carrier 68 and into a cavity 102 defined by the body of the carrier 68 axially between the forward and aft support ridges 98, 100. In the illustrative embodiment, the ceramic cloth ring 36 is a monolithic ring with an axial width 82 that is larger than an axial width 84 of the annular band 24 and about equal to the axial width 56 of each first blade track segment 54. In other embodiments, any suitable widths of the annular band 24 and the ceramic cloth ring 36 may be used.

In the illustrative embodiment, the plurality of blade track segments are positioned circumferentially around a central axis so that each first end face 38 engages the second end face 40 of a neighboring blade track segment 22. A flush interface is provided between each of the end faces 38, 40. Each of the blade track segments extend partway around an axis to form a ring. The annular band 24 may be heated relative to the blade track segments 22 to cause the annular band to expand and establish a larger diameter of sufficient distance to position the annular band 24 over the plurality of the blade track segments 22. When the annular band 24 cools to cause the diameter of the annular band to shrink correspondingly, the annular band 24 applies the radially inward force (or compressive force) on the radially-outer surface 42 of each of the plurality of blade track segments 22. The ceramic cloth ring 36 may be heated relative to the blade track segments 22 and positioned around the plurality of blade track segments 22 prior to positioning the annular band 24 around the plurality of blade track segments 22.

In some embodiments, the plurality of blade track segments 22 and the ceramic cloth ring 36 are cooled relative to the annular band 24 to cause the ring provided by the blade track segments 22 to establish a smaller diameter of sufficient distance to position the annular band 24 over the plurality of blade track segments 22. When the plurality of blade track segments warm to cause the diameter of the ring to grow correspondingly, the annular band 24 applies the radially inward force (or compressive force) on the radially-outer surface 42 of each of the plurality of blade track segments 22.

In some embodiments, the hotter the engine runs, the better the fuel efficiency. As ceramics are materials suitable for very high temperatures, a ceramic blade track may be able to sustain higher temperature, enabling increase performance, decrease fuel consumption and reduce pollution. Ceramics may be weak in tensions, but strong in compression. To take advantage of the compression strength of the ceramics, blade tracks may be subjected to compressive loads only. Some current blade track segment designs are subjected to compression and tension stresses. The present disclosure introduces blade tracks made of wedge-shaped blocks. The present design is simple with little or no stress concentrations and may be suitable for ceramic materials.

In some embodiments, the blade track segments 22 made of wedge-shaped blocks are assembled into a ring as shown in FIG. 2. The ring is held by a belt 24. The belt is made from CMC. There is small interference between the CMC belt inner diameter (ID) and the blade track ring outer diameter (OD). The belt is manufactured as full hoop and it is heated to increase the ID and facilitate assembly. After the belt is assembled, the belt cools off and puts the blade track ring in compression. The full hoop CMC belt may be strong in the hoop direction. The belt may not be subjected to flow path temperatures because it is placed at the OD of the blade track ring.

In some embodiments, an anti-rotation feature is provided by shorter and wider blade track segments 58. Sealing between the blade track and the carrier 68 is provided by a compliant layer made from ceramic fiber cloth 36. The ceramic fiber cloth 36 is held in place by the CMC belt which compresses the ceramic cloth 36.

In some embodiments, the present disclosure puts the blade track segments 22 in compression only and it is suited for materials that have very good material properties in compression. This design includes monolithic (isotropic) ceramic blade track segments 22 and may eliminate thermal stress issues seen in CMC blade track designs due to the orthotropic (or anisotropic) nature of those CMC materials. However, in other embodiments, CMC materials may be used in the blade track segments 22.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A blade track assembly for a gas turbine engine, the blade track assembly comprising
a plurality of blade track segments that comprise only isotropic ceramic materials, each of the plurality of blade track segments being wedge shaped, and the plurality of blade track segments positioned circumferentially around an axis to form a ring,
an annular band comprising anisotropic ceramic-matrix composite materials, the annular band being disposed circumferentially around each of the plurality of blade track segments to provide a radially inward force that acts against each of the plurality of blade track segments such that each of the plurality of blade track segments act as a voussoir to maintain a form of the ring, and a ceramic cloth ring that extends circumferentially around the plurality of blade track segments and located radially between the plurality of blade track segments and the annular band.

2. The blade track assembly of claim 1, wherein each of the plurality of blade track segments include a first end face, a second end face spaced apart circumferentially from the first end face, and a radially-outer surface that extends between the first end face and the second end face.

3. The blade track assembly of claim 2, wherein each end face of the blade track segments are arranged entirely along a plane that extends radially through the axis.

4. The blade track assembly of claim 2, wherein the radially outer surface of each of the blade track segments is continuous and formed without holes or protrusions.

5. The blade track assembly of claim 4, wherein each of the blade track segments includes a radially inner surface that is continuous and formed without holes or protrusions.

6. The blade track assembly of claim 5, wherein the radially-outer surface is spaced apart from the axis a first radial distance and the radially-inner surface is spaced apart from the axis a second radial distance that is less than the first radial distance and each blade track segment has a constant thickness defined by the difference between the first distance and the second distance.

7. The blade track assembly of claim 2, wherein the first end face and the second end face interconnect directly the radial-outer and radially-inner surfaces without any protrusions or cutouts formed therein.

8. The blade track assembly of claim 7, wherein the plurality of blade track segments include a plurality of first blade track segments and a plurality of second blade track segments with an axially-facing surface that is offset axially from the plurality of first blade track segments.

9. The blade track assembly of claim 8, further comprising a carrier arranged circumferentially around the annular band to support the plurality of blade tracks relative to the axis, and the carrier engages a circumferential end face of the second blade track segment to block rotation of the plurality of blade track segments about the axis.

10. The blade track assembly of claim 9, wherein the carrier is multi-piece in the circumferential direction and engages the leading end and the trailing end each of the first blade track segments to limit axial movement of the plurality of blade track segments relative to the axis.

11. The blade track assembly of claim 1, wherein the ceramic cloth ring has a first axial length and the annular band has a second axial length that is less than the first axial length.

12. A blade track assembly for a gas turbine engine, the blade track assembly comprising a plurality of blade track segments that comprise only isotropic ceramic materials, each of the plurality of blade track segments being wedge shaped, and the plurality of blade track segments positioned circumferentially around an axis to form a ring, an annular band comprising anisotropic ceramic-matrix composite materials, the annular band being disposed circumferentially around each of the plurality of blade track segments to provide a radially inward force that acts against each of the plurality of blade track segments such that each of the plurality of blade track segments act as a voussoir to maintain a form of the ring, wherein a first blade track segment included in the plurality blade track segments has a first axial length and a second blade track segment included in the plurality of blade track segments has a second axial length that is greater than the first axial length to provide an anti-rotation feature.

13. The blade track assembly of claim 12, wherein the first blade track segment has a first circumferential length, the second blade track segment has a second circumferential length, and the first circumferential length is greater than the second circumferential length.

14. A method comprising positioning a plurality of blade track segments circumferentially around a central axis, each blade track segment shaped to extend part-way around the central axis, locating the plurality of blade track segments around the central axis to form a ring of the plurality of blade track segments, heating an annular ceramic-matrix composite band, positioning the annular ceramic-matrix composite band circumferentially around the plurality of blade track segments after heating the annular ceramic-matrix composite band, and applying a compressive force against the each of the plurality of blade track segments with the annular ceramic-matrix composite band to maintain a form of the ring, wherein each of the blade track segments act as a voussoir to maintain a form of the ring, and further comprising positioning a ceramic cloth ring circumferentially around the plurality of blade track segments before positioning the annular ceramic-matrix composite band around the plurality of blade track segments.

15. The method of claim 14, wherein the plurality of blade track segments includes a first blade track segment having a first axial width and a first circumferential length and a second blade track segment having a second axial width and a second circumferential length, the second axial width is greater than the first axial length, and the first circumferential length is greater than the second circumferential length.

16. The method of claim 14, wherein the positioning a plurality of blade track segments includes positioning a plurality of first blade track segments partway around the central reference axis, each of the plurality of first blade track segments having a first axial width, and positioning at least one second blade track segment partway around the central axis between two of the first blade track segments to form the ring, the at least one second blade track segment having a second axial width that is greater than the first axial width.

17. The method of claim 16, further comprising arranging a carrier circumferentially around the plurality of blade track segments to cause the carrier to engage the second blade track segment to limit rotation of the plurality of blade track segments relative to the axis.

18. The method of claim 14, further comprising providing a carrier and engaging the ceramic cloth ring with the carrier to form a seal between the carrier and the plurality of blade track segments to block fluid flow between the carrier and the blade track segments in an axial direction.

* * * * *